(12) United States Patent
Dickson et al.

(10) Patent No.: US 7,818,288 B1
(45) Date of Patent: Oct. 19, 2010

(54) ETOM ENHANCEMENT OF FUNCTIONAL REQUIREMENTS MODELING

(75) Inventors: Thomas S. Dickson, Overland Park, KS (US); Carter Wayne Floyd, Jr., Overland Park, KS (US); Lavanya Srinivasan, Overland Park, KS (US); Robert Zagrosh, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 45 days.

(21) Appl. No.: 11/491,435

(22) Filed: Jul. 21, 2006

(51) Int. Cl.
*G06F 7/00* (2006.01)
*G06F 17/00* (2006.01)

(52) U.S. Cl. .................... 707/601; 707/810

(58) Field of Classification Search .............. None
See application file for complete search history.

(56) References Cited

U.S. PATENT DOCUMENTS

| | | | | |
|---|---|---|---|---|
| 5,303,170 | A * | 4/1994 | Valko | 703/2 |
| 5,978,811 | A * | 11/1999 | Smiley | 1/1 |
| 6,327,698 | B1 * | 12/2001 | Kolluru | 717/104 |
| 6,349,404 | B1 * | 2/2002 | Moore et al. | 717/104 |
| 6,446,053 | B1 * | 9/2002 | Elliott | 705/400 |
| 6,920,458 | B1 * | 7/2005 | Chu et al. | 707/600 |
| 7,640,531 | B1 * | 12/2009 | Akram et al. | 717/101 |
| 2002/0073078 | A1 * | 6/2002 | Ku et al. | 707/3 |
| 2002/0082904 | A1 * | 6/2002 | Grosshart et al. | 705/10 |
| 2003/0065663 | A1 * | 4/2003 | Chu | 707/10 |
| 2003/0208367 | A1 * | 11/2003 | Aizenbud-Reshef et al. | 705/1 |
| 2005/0027582 | A1 * | 2/2005 | Chereau et al. | 705/9 |
| 2005/0033725 | A1 * | 2/2005 | Potter et al. | 707/1 |
| 2005/0251525 | A1 * | 11/2005 | Chu et al. | 707/100 |
| 2006/0095309 | A1 * | 5/2006 | Mangan et al. | 705/8 |
| 2006/0095906 | A1 * | 5/2006 | Oikawa | 718/100 |
| 2006/0206368 | A1 * | 9/2006 | Bamberger et al. | 705/7 |

OTHER PUBLICATIONS

Information Modeling of Trouble: A service Provider View, Markovits et al (8th International Conference on Telecommunication—ConTEL 2005).*
How can the eTOM framework help service providers in today's marketplace? Milham et al (TELECOM italia—Noms 2004).*
A Roadmap for enterprise integration, Smith et al (Proceedings of the 10th International Workshop on Software Technology and Engineering Paratice (Step'02)).*

(Continued)

*Primary Examiner*—Pierre M Vital
*Assistant Examiner*—Augustine Obisesan

(57) ABSTRACT

A system and method are provided for modeling functional requirements for a project. The method includes creating a first model for a first project, categorizing a portion of the first model according to an eTOM area related to the first project, storing the first model in a repository according to the eTOM category, searching the repository for a model for a project categorized by an eTOM area similar to an eTOM area associated with a second project, and when a similar model is found, using the similar model as a basis for creation of a second model for the second project.

18 Claims, 3 Drawing Sheets

OTHER PUBLICATIONS

Series M: TMN and Network maintainace: International transmission systems, telephone circuits, telegraphy, facsimile and leased circuits, International Telecommunication Union (ITU-T Jun. 2004).*

A framework for understanding and analyzing eBusiness models, Pateli et al, 16th Bled eCommerce Conference, eTransformation, Bled, Slovenia, Jun. 9-11, 2003.*

Design and evaluation of e-Business models, Gordijn et al, IEEE Intelligent system, special issue on intelligent eBusiness, Apr. 2001.*

"eTOM Overview", TM Forum—Technical Programs, http://wwwtmforum.org/browse.asp?, Jan. 2006, pp. 1-2.

* cited by examiner

ETOM ENHANCEMENT OF FUNCTIONAL REQUIREMENTS MODELING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a method for modeling functional requirements, and more particularly, but not by way of limitation, to a method for categorizing existing functional requirements models to aid in the creation of new functional requirements models.

BACKGROUND OF THE INVENTION

Many telecommunications companies create models of the business, functional, and system requirements for their organization or a portion of their organization. A model might provide a graphical representation of the systems, processes, functions, personnel, hardware, software, and other entities needed to provide the services offered by the organization. The relationships among these entities and a designation of which entities will perform which activities might also be included in a model.

The enhanced Telecom Operations Map (eTOM) is sometimes used as a guide for the creation of models. eTOM provides a generic blueprint that can be used as a guide for modeling the internal processes of a telecommunications company. A company can then use the eTOM framework as a starting point for creating customized models of its processes or for analyzing its existing processes. The eTOM framework consists of a strategy, infrastructure, and product area that deals with strategy and lifecycle management; an operations area that deals with operations support, fulfillment, assurance, and billing; and an enterprise management area that deals with corporate-wide management. Each of these areas consists of multiple sub-areas.

As an example, eTOM might specify a generic hierarchy of processes and functions that should be followed in the area of order handling. There might be broad guidance dealing with taking orders, verifying orders, designing custom solutions to meet a customer's needs, resolving any concerns, tracking orders, and other order-related issues. Each telecommunications company might customize these broad guidelines to create models that meet its specific needs and circumstances. In this way, eTOM allows different companies to deal with each other and their vendors in a standard manner.

SUMMARY OF THE INVENTION

An embodiment of the present disclosure provides a method for modeling functional requirements for a project. The method includes creating a first model for a first project, categorizing a portion of the first model according to an eTOM area related to the first project, storing the first model in a repository according to the eTOM category, searching the repository for a model for a project categorized by an eTOM area similar to an eTOM area associated with a second project, and when a similar model is found, using the similar model as a basis for creation of a second model for the second project.

In another embodiment, a system for modeling functional requirements for a project is provided. The system comprises a model creation tool, a categorization component, a repository, and a search component. The model creation tool can create a first model for a first project. The categorization component can categorize a portion of the first model according to an eTOM area related to the first project. The repository can store the first model according to the eTOM category. The search component can search the repository for a model for a project categorized by an eTOM area similar to an eTOM area associated with a second project. When a similar model is found, the similar model is used as a basis for creation of a second model for the second project.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
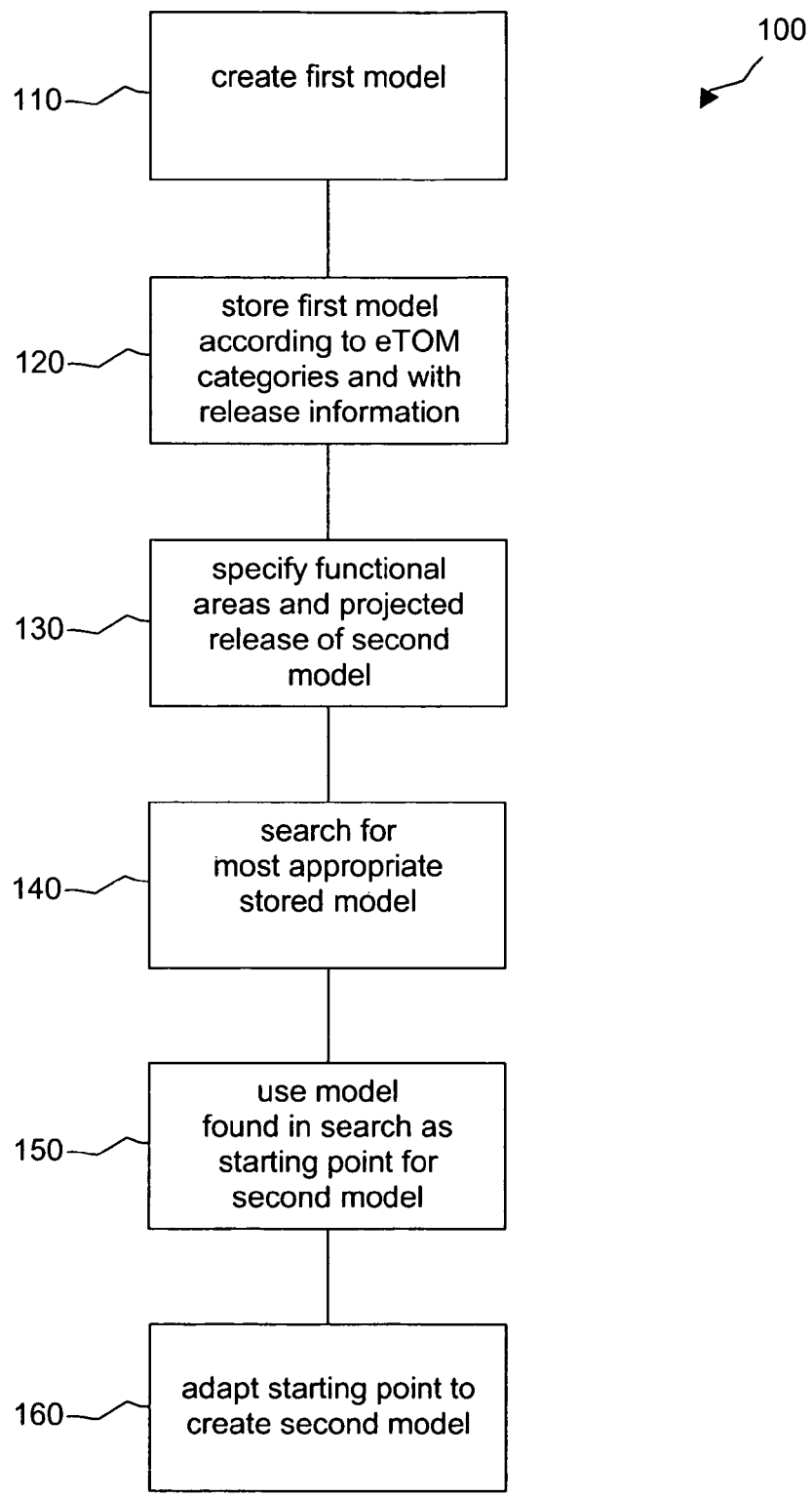
FIG. 1 is a flow chart of a method for modeling functional requirements for a project according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Several commercial, off-the-shelf products are available to aid in the creation of business, functional, system and other models. For example, Corporate Modeler from Casewise is sometimes used to create and store models. As used herein, the term 'Casewise' will refer to any such product. It should be understood that other products from other manufacturers could perform functions similar to those described herein.

Casewise is typically used to create a single, static view of an enterprise or a portion of an enterprise. That is, a chart, diagram, or other graphical representation of the systems, processes, functions, personnel, hardware, software, and other entities in an enterprise is typically created. Such an overall view of the enterprise also typically contains graphical representations of the relationships between these entities and the responsibilities of the entities. Information about specific products used to perform specific functions might also be included. Views such as these tend to change infrequently since the large-scale structure of an enterprise tends to be relatively static.

In embodiments of the present disclosure, Casewise (or a similar functional requirements modeler) is used to create models of the projects that are undertaken by an enterprise. That is, in addition to an overall model of an organization, models are created of individual activities or groups of activities. One or more models might be created for each project or proposed project.

In an embodiment, project models are organized according to the framework suggested by eTOM. Casewise might be used to associate different portions of a project to different areas in eTOM. Functional and system requirements modeled by Casewise might also be associated with eTOM areas. Models created in this manner might then be filed based on the eTOM area information. Since Casewise can include product data and other information, filing of project models might also be done based on product, market segment, sales channel, or other categories.

Filing of the project models based on their content allows easy reuse of models. If models were not categorized and filed by subject matter, a duplication of effort could occur. Each person creating a model might create a new model from scratch even though a model with many similarities might already exist that could easily be adapted for use in the new model. Without a model categorization and filing system, a modeler might have no way of knowing if similar models already exist other than relying on memory. A modeler might have to look through all previous models to determine whether any portions of the models could be adapted for a new model.

Under the current embodiments, a modeler wishing to create a new project model can check a repository of models that are categorized according to the eTOM framework. If a previous model similar to the desired new model is found, the similar model can be adapted to create the new model. This can save time and effort compared to starting from scratch whenever a new model is to be created.

In one embodiment, the repository contains templates of models that can be used as the basis for the creation of actual project models. Alternatively, actual project models that have been created in the past might be stored in the repository and be available as starting points for new models. After creating a new model, a modeler might file the new model in the repository so that it is available for use as a starting point for future models.

Projects typically have a date or a range of dates, known as the release date, when they are scheduled to be implemented. In an embodiment, in addition to being categorized by eTOM area, a stored project model can be categorized by the release date of the project being modeled. The release dates for the projects whose models are stored in the repository can be taken into account when the repository is searched for a previous model that can be used as the basis for a new model. Since the parameters used to model a project may change from one release to another, it is typically desirable to use a model for an existing project that has a release date similar to the release date of the new project being modeled. If a model with a significantly earlier release date is used as a starting point for the new model, parameters that have changed since the creation of the earlier model may be inadvertently omitted from the new model.

For example, a model might be created for a project with a release date in January of a particular year. Later, another model might be created for the July release of the same project. Both models might be stored in the model repository. If a new model were to be created for the same project, it would typically be desirable to use the July model as the basis for the new model so that any changes that were made between the January and July versions of the model could be incorporated into the new model.

In an embodiment, the implementation status of existing projects can be taken into account when a new model is being created. The status of a project might be defined to be either planned, committed, or implemented, where an implemented project is one in actual use, a committed project is one that is not yet in use but to which a commitment has been made, and a planned project is one to which a commitment has not yet been made. It is typically desirable to use models of committed or implemented projects as the basis for new models since changes are not likely to be made to such models.

A model of a planned project might change over time. If a new model is based on a model of a planned project, the new model could be based on project parameters that are no longer relevant. Therefore, it is typically not desirable to use a model of a planned project as the basis for a new model. An exception might occur when an individual or group creates a model for a planned project and then wishes to use that model as the basis for a new model of the same planned project.

An enterprise might have a blueprint that specifies which applications impact which projects. In an embodiment, project models are categorized in the repository by the applications that impact the projects that are modeled. A modeler creating a new model for a project can search for existing models of projects that are impacted by similar applications and can use those existing models as the basis for the creation of the new model.

In an embodiment, the requirements needed to complete a project are also used as a category by which project models are organized in the model repository. A modeler can search for requirements of existing projects that are similar to the requirements for a new project. A model for a project with similar requirements can be used as a starting point for a new model. The requirements might be stored with their associated eTOM functional areas. The requirements might be functional requirements, system requirements, or both.

A search can be performed of the project model repository to find one or more existing models that can be used as the basis for the creation of a new model. The search can be based on the eTOM area, the release date, the implementation status, the impacting applications, or the requirements associated with the existing models. Searches can also be done based on various combinations of these elements. In one embodiment, a search is done manually. That is, a modeler can examine the contents of the repository and attempt to find one or more existing models that can be adapted into a new model.

In another embodiment, an automated search of the repository can be performed. That is, an automated tool may be available that can assist a modeler in finding an appropriate existing model to use as the basis for a new model. The modeler might enter parameters into the tool that pertain to a proposed project. The tool might then automatically search the repository for existing models of projects that have similar parameters. The tool might select one or more existing models based on the eTOM area, the release date, the implementation status, the impacting applications, and/or the requirements associated with the existing models. These elements might be given different weightings in order to determine the most appropriate existing model or models.

In one case, the tool might determine a single existing model that is most appropriate for use as the basis for a new model. In another case, the tool might identify several different models that might be appropriate. The modeler might select one of these models as the basis for a new model. Alternatively, the modeler might select portions of the models and combine the portions into the basis for a new model.

The project models in the repository can provide a view of the current status of an enterprise and of different potential future statuses. One model or set of models might represent the current status while another model or set of models might represent projections of various future statuses. The models of the future statuses can be based on the current status models to show the different directions in which the enterprise might evolve from the current state. These future status models can be considered 'what-if' scenarios. At some point, one of the what-if scenarios might become committed as the model of record and other models would thereafter be built off of that one. Thus, a single repository can contain both the current model and multiple branches containing potential future models, each of which might become the committed model upon which other potential future models might be built.

FIG. 1 depicts a method 100 for creating a model according to an embodiment of the present disclosure. In box 110, a first model of a project is created. In box 120, the first model is categorized according to the eTOM areas applicable to the project being modeled. The first model might also be categorized by the release date of the project and other project-related information. The first model is then stored in a repository with its associated category information.

In box 130, a modeler wishing to create a second model specifies the eTOM areas applicable to the project to be modeled by the second model. The modeler might also specify the release date of the project modeled by the second model and other project-related information. The project modeled by the second model might be different from the project modeled by the first model or might be a different version of the project modeled by the first model.

In box 140, a search is conducted of the repository to find a model with characteristics that might be useful as a basis for the creation of the second model. The search might be conducted manually by the modeler or might be conducted automatically by a search tool. The modeler might enter the desired characteristics of the second model into the search tool. The search tool might then search the repository for existing models with some or all of the desired characteristics and might inform the modeler of the models that were found.

In box 150, the modeler uses one or more of the models found in the search of the repository as a starting point for the creation of the second model. In box 160, the modeler creates the second model.

Figure 2:
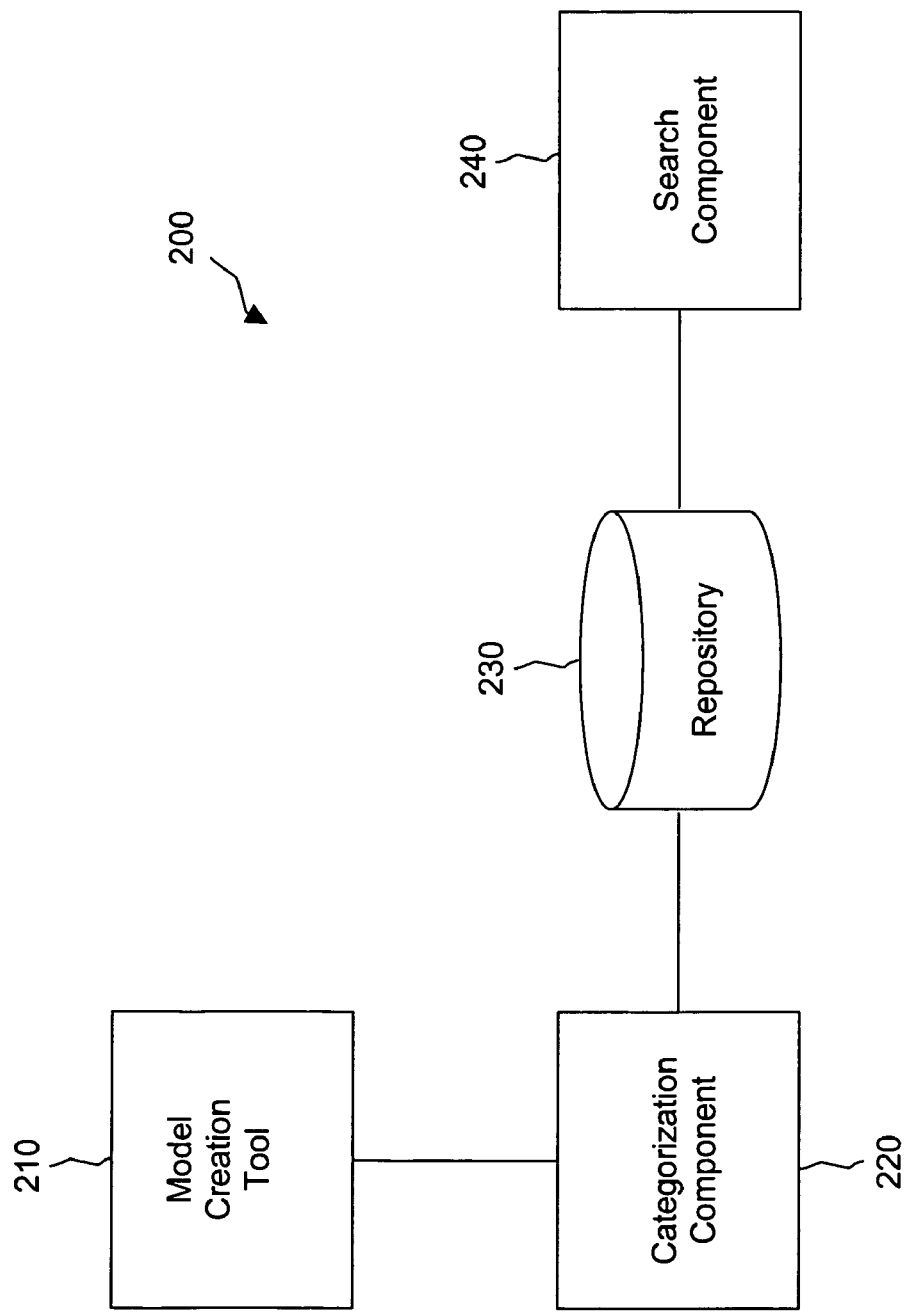
FIG. 2 illustrates a block diagram of a system for modeling functional requirements for a project according to one embodiment of the present disclosure.

FIG. 2 illustrates a system 200 for modeling functional requirements according to an embodiment of the present disclosure. A model creation tool 210 can be used to create a model for a project. A categorization component 220 can be used to categorize the model or a portion of the model based on the eTOM area or areas that apply to the project. The model is then stored in a repository 230 based on the eTOM area or areas.

When a new model is to be created, a search component 240 can be used to search through the repository 230 for an existing model that has been categorized according to an eTOM area that is similar to an eTOM area that applies to the new model. If a similar model is found in the repository 230, the similar model can be used as the basis for the creation of the new model.

While the above discussion has focused on the creation of models for new products or new services, it should be understood that the method and system described herein could also be used in the modification of existing products or services. The versioning and/or updating of existing models and requirements could also be supported.

Figure 3:
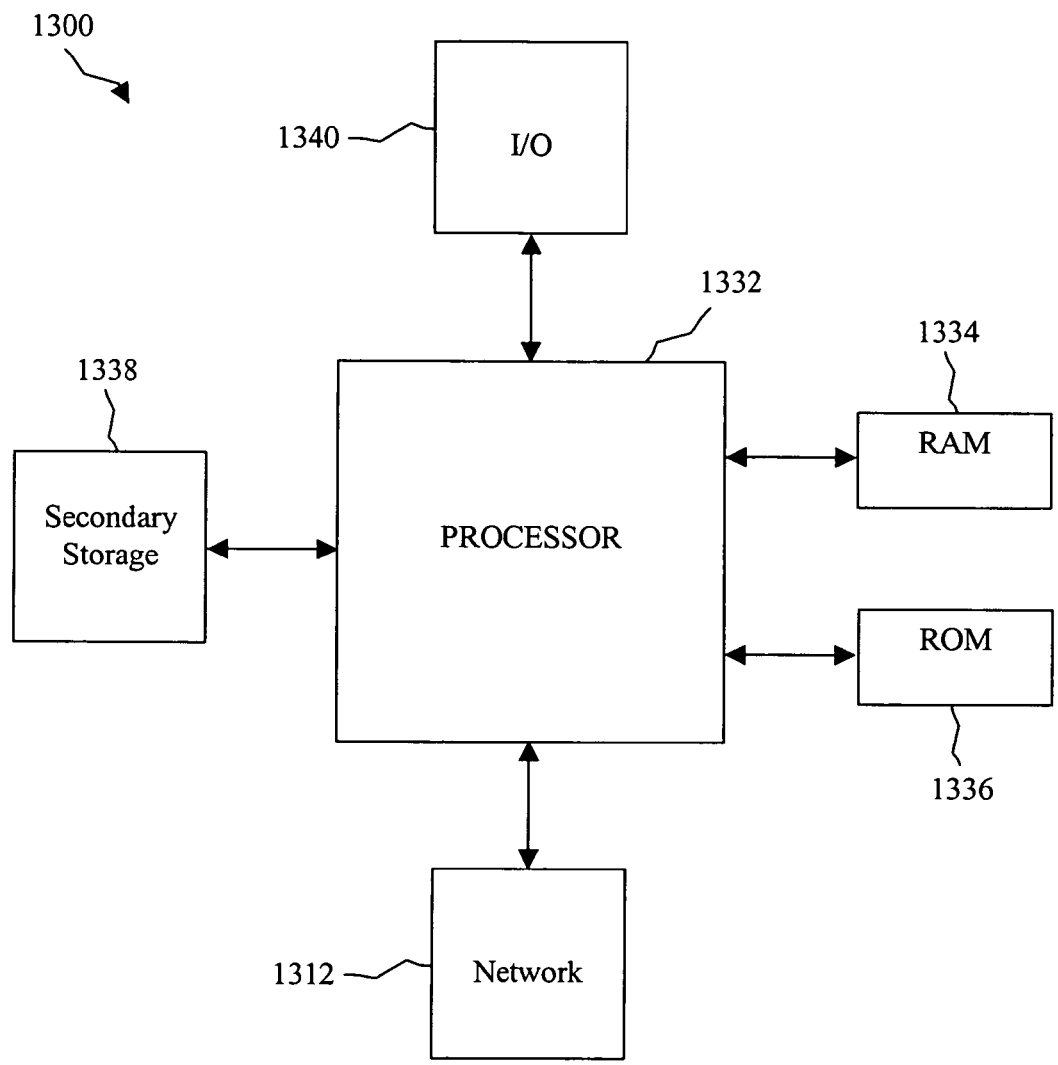
FIG. 3 illustrates an exemplary general-purpose computer system suitable for implementing the several embodiments of the present disclosure.

The method and system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for modeling functional requirements for a new project based on reuse of at least a portion of a first model of a first project, comprising:
    creating the first model for the first project, wherein the first model is a graphical representation of requirements of the first project including representations of one or more systems, processes, personnel, functions, hardware, or software entities;
    categorizing a plurality of portions of the first model according to a plurality of enhanced telecommunications operations map areas related to the first project, wherein a first of the plurality of portions of the first model is categorized in a first enhanced telecommunication operations map area and a second of the plurality of portions of the first model is categorized in a second enhanced telecommunication operations map area that is different from the first enhance telecommunication operations map area;
    storing the first model in a repository according to the plurality of enhanced telecommunications operations map categories;
    for the new project that has a project requirement associated with the first enhanced telecommunication operations map area, searching the repository for one or more models with at least a portion categorized by the first enhanced telecommunications operations map area;
    responsive to finding the first model based on the search, using the first portion of the first model as a basis for creation of a second model for the new project, wherein the second model is a graphical representation of requirements of the new project including representations of one or more systems, processes, personnel, functions, hardware, or software entities; and
    storing the second model in the repository according to at least one of:
        an enhanced telecommunications operations map area related to the new project;
        a release date of the new project;
        an implementation status of the new project;
        an application impacting the new project; and
        a requirement of the new project.

2. The method of claim 1, wherein a portion of the first model is further categorized by an application impacting the first project and the repository is further searched for one or more models categorized by an application impacting the first project similar to an application impacting the new project.

3. The method of claim 2, wherein a portion of the first model is further categorized by a requirement of the first project and the repository is further searched for one or more models categorized by a requirement similar to a requirement associated with the new project.

4. The method of claim 3, wherein a portion of the first model is further categorized by an implementation status of the first project and the repository is further searched for one or more models categorized by an implementation status similar to an implementation status associated with the new project.

5. The method of claim 4, wherein a portion of the first model is further categorized by a release date of the first project and the repository is further searched for one or more models categorized by a release date similar to a release date associated with the new project.

6. The method of claim 5, wherein the implementation status is one of:
    implemented;
    committed; and
    planned.

7. The method of claim 6, wherein a model for a project with an implementation status of planned is not used as the basis for the creation of the second model for the new project.

8. The method of claim 7, wherein the requirement is one of:
    a functional requirement; and
    a system requirement.

9. The method of claim 8, wherein the searching of the repository is one of:
    a manual search; and
    an automatic search conducted by a search tool capable of receiving a search parameter, searching the repository for a model that matches the parameter, and retrieving at least one model that matches the parameter.

10. The method of claim 9, wherein the search tool retrieves a model that best matches the parameter.

11. The method of claim 9, wherein the search tool retrieves a plurality of models that match the parameter and a manual selection is made from the plurality of models of a model to be used as the basis for the creation of the second model for the new project.

12. The method of claim 9, wherein the search tool retrieves a plurality of models that match the parameter and a manual selection is made of a plurality of portions of the plurality of models and the plurality of portions is combined into the basis for the creation of the second model for the new project.

13. The method of claim 1, further comprising storing in the repository at least one model of a plurality of current projects and at least one model of a plurality of future projects, wherein the at least one model of a plurality of future projects is based on the at least one model of a plurality of current projects, and wherein the at least one model of a plurality of future projects can become a basis for a future model.

14. A system for modeling functional requirements for a new project based on reuse of at least a portion of a first model of a first project, comprising:
- at least one processor;
- a computer-implemented model creation tool configured to execute on the at least one processor, the model creation tool creates the first model for the first project, wherein the first model is a graphical representation of requirements of the first project including representations of one or more systems, processes, personnel, functions hardware, or software entities;
- a computer-implemented categorization component configured to execute on the at least one processor, the categorization component categorizes a plurality of portions of the first model according to a plurality of enhanced telecommunications operations map areas related to the first project, wherein a first of the plurality of portions of the first model is categorized in a first enhanced telecommunication operations map area and a second of the plurality of portions of the first model is categorized in a second enhanced telecommunication operations map area that is different from the first enhanced telecommunication operations map area;
- a repository that stores the first model according to the enhanced telecommunications operations map categories; and
- a search component configured based on the new project that having a project requirement associated with the first enhanced telecommunication operations map area to search the repository for one or more models with at least a portion categorized by the first enhanced telecommunications operations map area, wherein when the first model is found based on the search, the first portion of the first model is used as a basis for creation of a second model for the new project, wherein the second model is a graphical representation of requirements of the new project including representations of one or more systems, processes, personnel, functions, hardware, or software entities,
- wherein the repository further stores the second model according to at least one of:
  - an enhanced telecommunications operations map area related to the new project;
  - a release date of the new project;
  - an implementation status of the new project;
  - an application impacting the new project; and
  - a requirement of the new project.

15. The system of claim 14, wherein a portion of the first model is further categorized by a release date of the first project, by an implementation status of the first project, by an application impacting the first project, and by a requirement of the first project and the repository is further searched for one or more models categorized by a release date similar to a release date associated with the new project, by an implementation status similar to an implementation status associated with the new project, by an application impacting the first project similar to an application impacting the new project, and by a requirement similar to a requirement associated with the new project.

16. The system of claim 15, wherein the implementation status is one of:
- implemented;
- committed; and
- planned;
- and wherein a model for a project with an implementation status of planned is not used as the basis for the creation of the second model for the new project.

17. The system of claim 16, wherein the searching of the repository is one of:
- a manual search; and
- an automatic search conducted by a search tool capable of receiving a search parameter, searching the repository for a model that matches the parameter, and retrieving a model that best matches the parameter.

18. The system of claim 14, further comprising storing in the repository at least one model of a plurality of current projects and at least one model of a plurality of future projects, wherein the at least one model of a plurality of future projects is based on the at least one model of a plurality of current projects, and wherein the at least one model of a plurality of future projects can become a basis for a future model.

* * * * *